United States Patent
da Silva Filgueiras

(10) Patent No.: US 6,548,974 B2
(45) Date of Patent: Apr. 15, 2003

(54) METHOD FOR MONITORING AND INFLUENCING AN ELECTRIC MOTOR

(75) Inventor: Alexandre da Silva Filgueiras, Sao Paulo (BR)

(73) Assignee: Leopold Kostal GmbH & Co., Ludenscheid (DE)

( * ) Notice: Subject to any disclaimer, the term of this patent is extended or adjusted under 35 U.S.C. 154(b) by 0 days.

(21) Appl. No.: 10/167,896

(22) Filed: Jun. 12, 2002

(65) Prior Publication Data

US 2002/0180389 A1 Dec. 5, 2002

Related U.S. Application Data

(63) Continuation of application No. PCT/EP01/02596, filed on Mar. 8, 2001.

(30) Foreign Application Priority Data

Mar. 11, 2000 (DE) .......................................... 100 11 982

(51) Int. Cl.[7] .................................................. H02P 7/00
(52) U.S. Cl. ........................ 318/432; 318/280; 318/283; 318/286; 318/434; 318/468; 318/469
(58) Field of Search ................................. 318/280, 283, 318/286, 468, 432, 434, 466, 469

(56) References Cited

U.S. PATENT DOCUMENTS

| | | | | |
|---|---|---|---|---|
| 4,468,596 A | * | 8/1984 | Kinzl et al. ................. | 318/287 |
| 4,929,875 A | | 5/1990 | Olsson | |
| 4,983,896 A | * | 1/1991 | Sugiyama et al. .......... | 318/286 |
| 5,436,539 A | * | 7/1995 | Wrenbeck et al. .......... | 318/265 |
| 5,668,451 A | | 9/1997 | Driendl et al. | |
| 5,952,801 A | * | 9/1999 | Boisvert et al. ............ | 318/468 |
| 5,994,858 A | * | 11/1999 | Mirura ....................... | 318/283 |
| 6,034,495 A | * | 3/2000 | Tamagawa et al. ......... | 318/266 |
| 6,034,497 A | * | 3/2000 | Tamagawa et al. ......... | 318/466 |

\* cited by examiner

Primary Examiner—Robert E. Nappi
Assistant Examiner—Tyrone Smith
(74) Attorney, Agent, or Firm—Brooks & Kushman, P.C.

(57) ABSTRACT

The invention relates to a process for monitoring and controlling an electric motor, in particular one that is present on a movable object on a motor vehicle, such as a window or sunroof. The invention resolves the technical problem of reliably recognizing the pinching of a foreign body in the window or sunroof, such that the window or sunroof can be stopped or reversed in time, without the time-consuming calculation of energy balances, closing forces etc and/or the observation of the force development during the time window comprising a complete pinching process. This aim is achieved in that the criterium for stopping or reversing is obtained by comparing the currently measured value of the motor current $I(t_0)$ with a reference value $I_{ref}$, formed from a stored value of motor current $I(t_{-N})$ taken after a defined amount of motor rotation has occurred, with the introduction of further parameters.

13 Claims, 1 Drawing Sheet

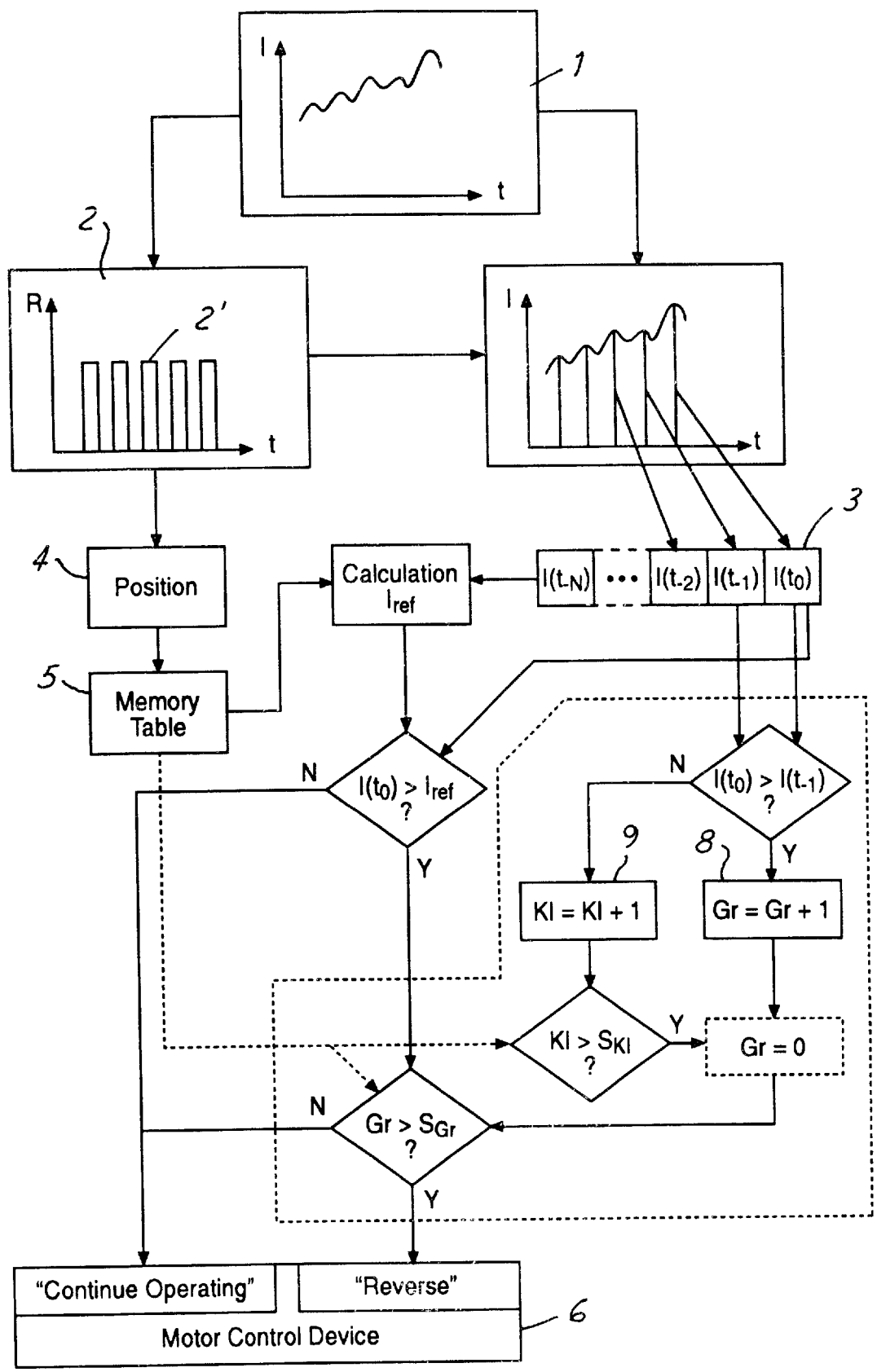

METHOD FOR MONITORING AND INFLUENCING AN ELECTRIC MOTOR

CROSS-REFERENCE TO RELATED APPLICATIONS

This is a continuation of International Application PCT/EP01/02596, published in German, with an international filing date of Mar. 8, 2001.

BACKGROUND OF THE INVENTION

1. Field of the Invention

This invention starts from a process for monitoring and controlling an electric motor which is associated, through an adjusting device, with a movable object, especially one that is present on a motor vehicle.

2. Background Art

Such processes are intended to enable automatic adjustment of the movable object, which could be a window or a sunroof, for example, while taking into account safety requirements, which also follow from legal provisions, among other things. In particular, these safety requirements concern limiting the possible pinching force in case an object or body part is located in the closing path of the automatically closing window or sunroof.

The invention concerns especially such a process which involves producing a signal to stop or reverse the rotation of the motor as a function of a currently measured value of motor current and a value of motor current measured at a previous point in time.

Such a process is disclosed by DE 44 42 171 A1. This previously known process involves continuously capturing all the motor's operating parameters —and thus in particular also the motor current—at measurement time points which are equally spaced in time during the movement of the movable object. The operating parameters are used to determine an energy balance, and from that a total force, which in turn is used, with the help of a fixed time window, to determine a pinching force.

SUMMARY OF THE INVENTION

By contrast, this invention is based on the task of specifying a process which also reliably recognizes the case of pinching and is capable of stopping or reversing the window or sunroof in good time, however without this necessitating an elaborate calculation of energy balances, total forces, pinching forces, etc., as well as tracking the behavior of the force at equidistant measurement points over a time range comprising an entire closing process.

According to the invention this task is solved by storing in a memory the value of the motor current $I(t_0)$, which is always measured simultaneously with a specified slope (rising or falling) of a rectangular-pulse signal that is produced by a pulse generator and that is proportional to the motor speed, and using a stored value of the motor current $I(t_{-N})$, that was measured $N(N>1)$ relevant signal slopes ago, along with other parameters to form a reference value $I_{ref}$, which is compared with the currently measured value of the motor current $I(t_0)$, and immediately producing the stopping or reversing signal if the currently measured value $I(t_0)$ exceeds the reference value $I_{ref}$.

Alternatively, to make available another criterion for recognizing pinching, the currently measured value of the motor current $I(t_0)$ is compared with the value of the motor current $I(t_{-1})$ that was measured and stored immediately before, and, if the currently measured value of the motor current $I(t_0)$ is greater than the value of the motor current stored immediately before $I(t_{-1})$, a first counter "greater" is incremented by the value "one", and that, in order for the stopping or reversing signal to be produced, not only does the currently measured value $I(t_0)$ of the motor current have to exceed the reference value $I_{ref}$, as described above, but in addition, the content of the "greater" counter must simultaneously exceed a threshold value $s_{Gr}$.

BRIEF DESCRIPTION OF THE DRAWINGS

The Figure illustrates a system for carrying out the process for monitoring and controlling an electric motor in accordance with the present invention.

DETAILED DESCRIPTION OF THE PREFERRED EMBODIMENT(S)

As can be seen in the FIGURE, a signal conditioning device 1 makes available the electric current signal $I(t)$ of a motor. Signal conditioning device 1 feeds the motor current signal $I(t)$ to a so-called "ripple detector" device 2. Ripple detector device 2 produces a digital rectangular-pulse signal 2' that is proportional to the motor speed. Simultaneously with the rising (or falling) slope of rectangular-pulse signal 2', the analog value of the motor current signal $I(t)$ is always written, as current value of the motor current $I(t_0)$, into a storage area of a micro-controller. The storage area of the micro-controller is organized as a shift register 3.

Shift register 3 stores the successively measured values of the motor current $I(t_{-N}), \ldots I(t_{-3}), I(t_{-2}), I(t_{-1}), I(t_0)$ in a sequence corresponding to the time sequence of their measurement. A position counter 4 uses digital rectangular-pulse signal 2' of ripple counter device 2 to determine the instantaneous adjustment position of an object in a vehicle being moved by the motor via an adjusting device.

The micro-controller uses a value of the motor current $I(t_{-N})$ stored a predetermined number N of measurements ago, (i.e., after a defined amount of motor rotation has occurred) along with other parameters to calculate a reference value $I_{ref}$. The reference value $I_{ref}$ is then compared with the currently measured value of the motor current $I(t_0)$. The other parameters used in calculating the reference value $I_{ref}$ include, for example, the supply voltage provided by the vehicle electrical system as well as partially position-dependent adjustment parameters that are stored in a table memory 5.

If the currently measured value of the motor current $I(t_0)$ exceeds the reference value $I_{ref}$, then a signal to stop or reverse the rotation of the motor is immediately issued to a motor control device 6, otherwise the motor control device receives a signal to continue, in the same direction, the movement of the object to be adjusted by the motor.

Because, in the described process, sporadic disturbances, for example, can now and again produce too high or too low measured values of the motor current $I(t)$, which then cause incorrect reactions of motor control device 6, a further development of the measurement process introduces another criterion. The additional criterion is an additional necessary condition for producing the stopping or reversing signal for the motor. To form this additional criterion, which is intended to confirm a tendency of the motor current which is continuously present over a longer period of time, a memory has a first "greater" counter 8 and a second "less than" counter 9. First greater counter 8 and second less than counter 9 both contain the value "null" at the beginning of the adjustment.

During the continuous measurement and storage of the motor current values, the currently measured value $I(t_0)$ is now always compared with the value measured immediately before $I(t_{-1})$. If $I(t_0)$ is greater than $I(t_{-1})$, first greater counter 8 is incremented by the value one. If $I(t_0)$ is less than or equal to $I(t_{-1})$, second less than counter 9 is incremented by the value one. The first and second counters 8 and 9 have threshold values $s_{Gr}$ and $s_{K1}$. A table memory 5 stores the threshold values $s_{Gr}$ and $s_{K1}$ either as fixed values for the entire movement sequence or as position-dependent table values.

The process that is carried out using first and second counters 8 and 9 proceeds as previously described until the point when the currently measured value of the motor current $I(t_0)$ is compared with the reference value $I_{ref}$. Now, however, if the currently measured value of the motor current $I(t_0)$ exceeds the reference value $I_{ref}$, the signal to stop or reverse motor operation is not immediately issued, but rather a check is made first as to whether the additional condition is also met. The additional condition being whether the content of first greater counter 8 also exceeds its threshold value $s_{Gr}$.

Only if both conditions are simultaneously met is the corresponding signal issued, otherwise the movement of the object to be adjusted by the motor continues in the same direction. Second less than counter 9 is used to reset first greater counter 8 as follows. If the content of second less than counter 9 exceeds the threshold value $s_{K1}$ assigned to the second less than counter, then the content of first greater counter 8 is reset to the initial value "zero", independent of the counter value that was just present in the first greater counter.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for monitoring and controlling an electric motor operable for being driven by motor current to move a movable object, the system comprising:
   a pulse generator for generating a sequence of rectangular-pulse signals as a function of motor speed;
   a motor current sensor for measuring a value of the motor current simultaneously with a specified slope of each respective rectangular-pulse signal;
   a memory register for storing the measured motor current values;
   a processor for calculating a reference value $I_{ref}$ as a function of the motor current value $I(t_{-N})$ measured N (N>1) rectangular-pulse signal slopes prior to a currently measured motor current value $I(t_0)$;
   wherein the processor compares the currently measured motor current value $I(t_0)$ to the reference value $I_{ref}$ and compares the currently measured motor current value $I(t_0)$ to an immediately preceding measured motor current value $I(t_{-1})$;
   wherein the processor increments a first counter if the currently measured motor current value $I(t_0)$ is greater than the immediately preceding measured motor current value $I(t_{-1})$, increments a second counter if the currently measured motor current value $I(t_0)$ is less than or equal to the immediately preceding measured motor current value $I(t_{-1})$, and resets the first counter when the second counter exceeds a stored second threshold value; and
   wherein the processor generates at least one of a stopping and a reversing signal for the motor if the currently measured motor current value $I(t_0)$ exceeds the reference value $I_{ref}$ and the first counter simultaneously exceeds a stored first threshold value.

2. The system of claim 1 wherein:
   the pulse generator includes a digitizing unit which generates the rectangular-pulse signals from ripple content superimposed onto a direct component of the motor current.

3. The system of claim 1 wherein:
   the processor uses the rectangular-pulse signals to determine position of the movable object and calculates the reference value $I_{ref}$ as a function of position-dependent parameters of the movable object.

4. The system of claim 1 wherein:
   the memory register is a shift register memory operable for continuous storage of the measured motor current values.

5. The system of claim 1 wherein:
   the specified slope of each respective rectangular-pulse signal is the rising slope of the rectangular-pulse signals.

6. The system of claim 1 wherein:
   the specified slope of each respective rectangular-pulse signal is the falling slope of the rectangular-pulse signals.

7. A method for monitoring and controlling an electric motor operable for being driven by motor current to move a movable object, the method comprising:
   generating a sequence of rectangular-pulse signals as a function of motor speed;
   measuring a value of the motor current simultaneously with a specified slope of each respective rectangular-pulse signal;
   storing the measured motor current values in a memory register;
   calculating a reference value $I_{ref}$ as a function of the motor current value $I(t_{-N})$ measured N (N>1) rectangular-pulse signal slopes prior to a currently measured motor current value $I(t_0)$;
   comparing the currently measured motor current value $I(t_0)$ to the reference value $I_{ref}$;
   comparing the currently measured motor current value $I(t_0)$ to an immediately preceding measured motor current value $I(t_{-1})$;
   incrementing a first counter if the currently measured motor current value $I(t_0)$ is greater than the immediately preceding measured motor current value $I(t_{-1})$;
   incrementing a second counter if the currently measured motor current value $I(t_0)$ is less than or equal to the immediately preceding measured motor current value $I(t_{-1})$;
   resetting the first counter when the second counter exceeds a stored second threshold value; and
   generating at least one of a stopping and a reversing signal for the motor if the currently measured motor current value $I(t_0)$ exceeds the reference value $I_{ref}$ and the first counter simultaneously exceeds a stored first threshold value.

8. The method of claim 7 wherein:
   the stored first and second threshold values depend on the position of the movable object.

9. The method of claim 7 wherein:
   generating a sequence of rectangular-pulse signals includes using a pulse generator having a digitizing unit which generates the rectangular-pulse signals from ripple content superimposed onto a direct component of the motor current.

10. The method of claim 7 wherein:

calculating a reference value $I_{ref}$ includes calculating the reference value $I_{ref}$ as a function of position-dependent parameters of the movable object.

11. The method of claim 7 wherein:

the memory register is a shift register memory operable for continuous storage of each of the measured motor current values.

12. The method of claim 7 wherein:

the specified slope of each respective rectangular-pulse signal is the rising slope of the rectangular-pulse signals.

13. The method of claim 7 wherein:

the specified slope of each respective rectangular-pulse signal is the falling slope of the rectangular-pulse signals.

* * * * *